United States Patent
Kim et al.

(10) Patent No.: US 8,072,298 B2
(45) Date of Patent: Dec. 6, 2011

(54) RADIO FREQUENCY FILTER

(75) Inventors: Duk-Yong Kim, Gyeonggi-do (KR);
Chang-Woo You, Gyeonggi-do (KR);
Il-Doo Jang, Gyeonggi-do (KR);
Heang-Suk Choi, Gyeonggi-do (KR);
Byung-Chul Kim, Gyeonggi-do (KR)

(73) Assignee: KMW Inc. (KR)

( * ) Notice: Subject to any disclaimer, the term of this patent is extended or adjusted under 35 U.S.C. 154(b) by 155 days.

(21) Appl. No.: 12/514,482

(22) PCT Filed: Dec. 29, 2006

(86) PCT No.: PCT/KR2006/005911
§ 371 (c)(1),
(2), (4) Date: May 12, 2009

(87) PCT Pub. No.: WO2008/060012
PCT Pub. Date: May 22, 2008

(65) Prior Publication Data
US 2010/0052824 A1    Mar. 4, 2010

(30) Foreign Application Priority Data

Nov. 13, 2006 (KR) .................. 10-2006-0111902
Dec. 22, 2006 (KR) .................. 10-2006-0133213

(51) Int. Cl.
*H01P 1/20* (2006.01)
*H01P 11/00* (2006.01)
(52) U.S. Cl. .................... 333/202; 333/207; 29/600
(58) Field of Classification Search .............. 333/202, 333/203, 207; 29/600
See application file for complete search history.

(56) References Cited

U.S. PATENT DOCUMENTS

| 4,227,065 | A | | 10/1980 | Paradi |
| 4,630,012 | A | * | 12/1986 | Fuller et al. ............ 333/235 |
| 5,574,313 | A | * | 11/1996 | McKleroy ............... 257/728 |
| 5,576,112 | A | * | 11/1996 | Izuchi et al. ............ 428/654 |
| 5,595,670 | A | | 1/1997 | Mombo-Caristan |
| 5,608,363 | A | * | 3/1997 | Cameron et al. ........ 333/202 |
| 5,986,208 | A | | 11/1999 | Taylor |
| 6,198,366 | B1 | | 3/2001 | Dahl |
| 6,734,766 | B2 | * | 5/2004 | Lye et al. ............... 333/203 |
| 7,205,868 | B2 | * | 4/2007 | Park et al. .............. 333/203 |
| 7,352,264 | B2 | * | 4/2008 | Schwab et al. ......... 333/203 |

(Continued)

FOREIGN PATENT DOCUMENTS

EP    1544938 A1    6/2005

(Continued)

OTHER PUBLICATIONS

European Patent Office, European Search Report in EP 06835611, Jun. 21, 2011.

*Primary Examiner* — Seungsook Ham (57) ABSTRACT

A radio frequency filter comprising: housing body having input/output connectors and containing space which is divided into spaces by means of diaphragm; at least one resonator rod arranged in the housing; housing cover coupled to the housing body; wherein the housing body and the housing cover are coupled to each other by laser welding. The radio frequency filter according to the present invention can reduce PIMD due to reduce Contact Nonlinearity, and inhibit to erode away because the laser welding method dissolve different metallic materials each other and take a convalent bond, and reduce its manufacturing process time and cost because it is unnecessary drilling a hole and fastening a screw to fasten the housing and the housing cover each other and can simplify its manufacturing process and raise productivity because only irradiate laser beam on irradiated area of the housing cover.

16 Claims, 5 Drawing Sheets

U.S. PATENT DOCUMENTS 7,365,620 B2 * 4/2008 Taylor .......................... 333/252
2005/0219013 A1 * 10/2005 Kumar et al. ................ 333/203

FOREIGN PATENT DOCUMENTS

| | | | |
|---|---|---|---|
| EP | 1544940 | A1 | 6/2005 |
| JP | 58223349 | A | 12/1983 |
| JP | 05261566 | A | 10/1993 |
| JP | 06350304 | A | 12/1994 |
| JP | 2002239782 | A | 8/2002 |
| KR | 2005-54230 | A | 6/2005 |
| WO | 03-081711 | A1 | 3/2003 |

* cited by examiner

RADIO FREQUENCY FILTER

TECHNICAL FIELD

The present invention relates to radio frequency filter, more particularly to a radio frequency filter comprising housing body and housing cover which are laser welded to each other.

By means of that laser welding, the contact nonlinearity and PIMD (Passive Inter Modulation Distortion) of the radio frequency filter can be lessened.

Generally, mobile communication services demand enlargement of service capacity and better telephone call quality, thus it is very important matter to decreasing I/L (Input loss), Attenuation and IMD (Inter Modulation Distortion).

It is very important problem to solve the IMD that is a phenomena in which at least two different signals of frequency interfere and cause undesired parasitic signal.

Meanwhile, owing to nonlinear transmission characteristic, the phenomena in which supplementary signals or canceling signals of many different signals exist in output signal of electronical appliances causes interference, and it is PIMD (Passive Inter Modulation Distortion) that said phenomena occurs in passive elements.

Particularly, PIMD occurred in certain frequency band cannot be eliminated by filtering method, it is studied to eliminate the source of occurrence.

Conventionally, PIMD was considered as a major factor just in the field of high power communication system like satellite communication system, but in commercial communication system it was almost ignored.

But, by the growth of mobile communication service, the number of subscribers increase, and transmission power grows higher, it is studied to lessen the PIMD in the field of mobile communication.

Hereinafter, conventional radio frequency filter will be described with reference to the accompanying drawings.

Figure 1:
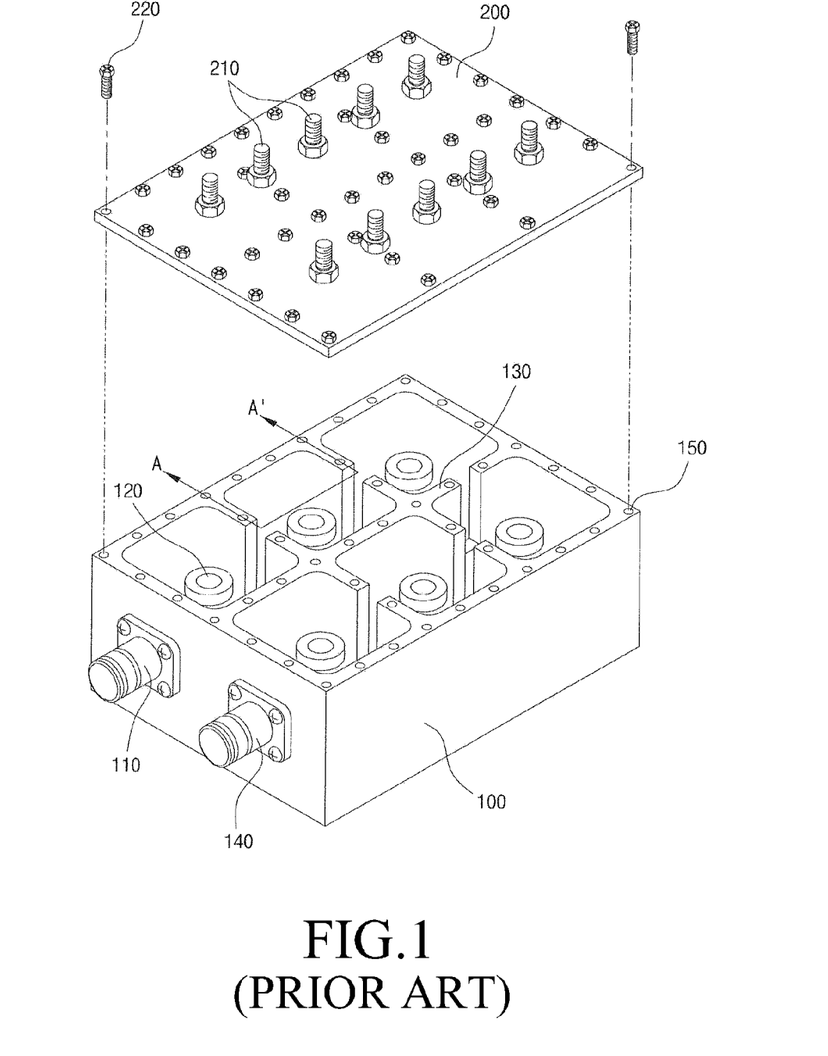
FIG. 1 is perspective view showing an embodiment of a radio frequency filter according to the prior art.
Figure 2:
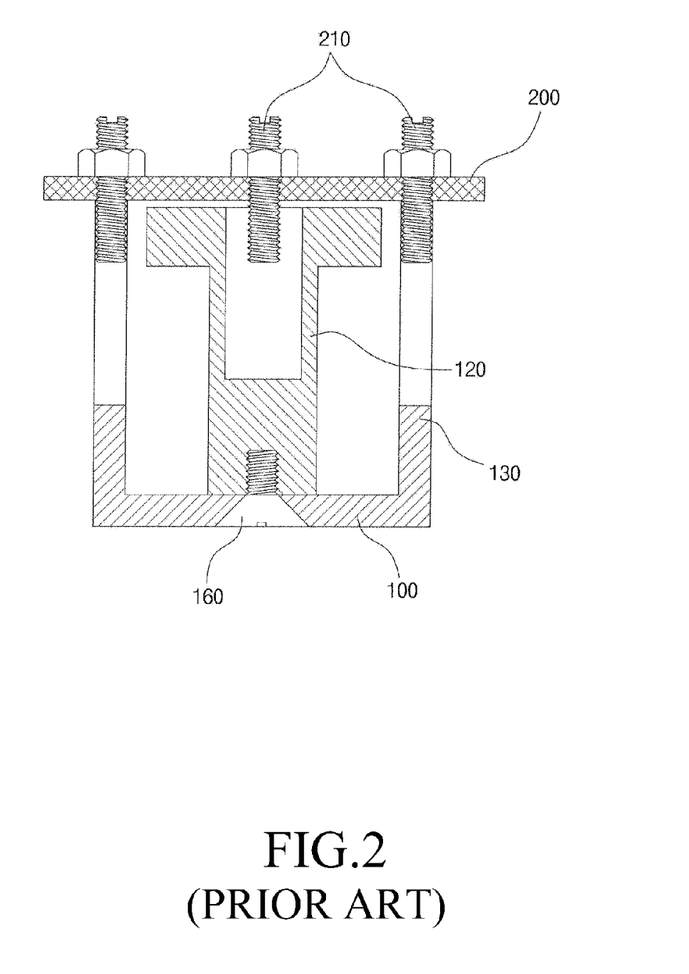
FIG. 2 is sectional view showing the construction of the radio frequency filter of FIG. 1, taken along line A-A'.

FIG. 1 is perspective view showing an embodiment of a radio frequency filter according to the prior art and FIG. 2 is sectional view showing the construction of the radio frequency filter of FIG. 1, taken along line A-A'.

Referring to FIG. 1 and FIG. 2, conventional radio frequency filter comprises at least two resonator rods 120 arranged in space which is divided into spaces by means of diaphragm 130; and housing body 100 having input connector 110 which receives high frequency signal and supply it to the first resonator rod 120 and output connector 140 which output high frequency signal filtered by the resonator rods 120; and tuning screws 210 for tuning the frequency which extend to space in the diaphragm 130 and inside of the resonator rods 120; and housing cover 200 sealing the housing body 100 by means of connecting screws 220.

Hereinafter, structure and problem of the conventional radio frequency filter will be described.

The housing body 100 is generally made of aluminium alloy, and divided by diaphragm 130 defining spaces. Generally, the diaphragm 130 and the housing body 100 are manufactured in one body.

And, resonator rods 120 are installed inside of the spaces defined by the diaphragm 130.

Referring to FIG. 2, hole is formed in the upper side of said resonator rods 120, after the housing body 100 and the housing cover is connected tuning screw 210 is inserted into the hole.

The resonator rods 120 are fixed to the bottom of the housing body 100 by resonator rods fixing screws 160.

Accordingly, the housing body 100 and the resonator rods 120 are not one body but fixed by resonator rods fixing screws 160, contact nonlinearity of microscopic imperfect binding occurs between the housing body 100 and the resonator rods 120.

The said contact nonlinearity with material nonlinearity is major factor in occurrence of PIMD.

And, in upper surface of the housing body 100 and the diaphragm 130, numerous connecting holes 150 are formed. These connection holes 150 are formed by processing the one body manufactured housing body 100 and diaphragm 130.

The housing cover 200 is connected to the housing body 100 by connecting screws 220 which is screwed into the connecting holes 150 of the housing body 100.

Meanwhile, the reason for using numerous connecting holes 150 and connecting screws 220 screwed into above connecting holes 150 is to prevent signal loss and occurrence of PIMD by keep contact between the housing body 100 and housing cover 200.

However, connecting method by the numerous connecting screw 120 as above is point contact between housing cover 200 and housing body 100 and connecting screws 220, and sealing power is weakened in the part where the connecting screw 220 is not located.

And by the connecting condition like above, PIMD is occurred by contact non-linearity between the housing cover 200 and housing body 100.

Also, the housing body 100, the diaphragm 130, the resonator rods 120 and the housing cover 200 constitute parallel LC resonance circuit, by the high frequency signal input through the input connector, current occurs in copper wire (not drawn) connected to the input connector and by the current magnetic energy generates.

And the magnetic energy is transmitted to the parallel LC resonance circuit composed of the housing body 100, diaphragm 130, resonator rods 120 and housing cover 200, desired signal of frequency is output through output connector 140 by repeated transmitting resonance frequency of the resonance circuit to next resonance circuit.

And, different frequency from the resonance frequency is grounded.

The resonance frequency can be modulated by adjustment of the tuning screws 210.

Like this way, in conventional radio frequency filter, the housing body 100 and the housing cover 200 is connected by numerous connecting screws 220, it was a problem that contact nonlinearity between the housing body and the housing cover causes PIMD.

And, the housing body and housing cover are made of aluminium alloy and the connecting screws are made of stainless steel, they are different materials, so it is a problem that corrosion occurs by different materials contact.

And, process for forming numerous connecting holes and connecting process using connecting screws are required, it is a problem that it takes too much time to manufacture the filter and manufacturing process is complicated, manufacturing cost increases, and productivity decreases.

Meanwhile, reflection ratio of laser beam in surface of aluminium alloy is high in laser welding of aluminium alloy, there is a problem that crack occurs in welding area after laser welding is completed, so aluminium alloy material is not used for laser welding generally.

Accordingly, conventional radio frequency filter is made of aluminium alloy material, it is recognized that laser welding cannot be used for connecting housing body and housing cover of radio frequency filter made of aluminium alloy material.

DISCLOSURE OF INVENTION

Technical Problem

The present invention has been made to solve above mentioned problems, object of the present invention is to provide a radio frequency filter which can reduce PIMD due to reduce Contact Nonlinearity, because the housing and the housing cover are laser welded to each other.

Also, another object of the present invention is to provide a radio frequency filter which can prevent erosion of metallic materials which are different from each other, because the laser welding melts housing body and housing cover making a covalent bonding between each other.

Also, another object of the present invention is to provide a radio frequency filter which can raise productivity by reducing its manufacturing process time and cost because it is unnecessary of drilling a hole and fastening a screw to fasten the housing body and the housing cover each other.

Also, another object of the present invention is to solve the problem by using AL40 series aluminium alloy that conventional radio frequency filter cannot be manufactured by laser welding.

Technical Solution

A radio frequency filter according to present invention comprises:

housing body having input/output connectors and containing space which is divided into spaces by means of diaphragm; at least one resonator rod arranged in the housing; housing cover coupled to the housing body; wherein the housing body and the housing cover are connected to each other by laser welding.

A radio frequency filter according to present invention can further comprise at least one tuning screw for tuning resonance frequency.

Preferably, the incidence angle between laser beam of the laser welding and the housing cover is in the range of 0 to 45 degree.

Preferably, after the housing body and the housing cover are coupled, boundary of the two is welded by laser welding.

Preferably, the diameter of the laser beam focus is approximately in the range of 200~1000 micrometer.

Preferably, the housing cover is manufactured by rolling.

In case that the housing cover is manufactured by rolling, it has thickness in the range of 0.1~4 millimeter.

Preferably, the housing body and the housing cover are made of aluminium alloy.

Preferably, the housing cover is made of AL40 series aluminium alloy.

Preferably, the housing body is also made of AL40 series aluminium alloy.

Meanwhile, if all the housing body and the housing cover are not made of AL40 series aluminium alloy, AL40 series aluminium alloy is utilized as welding material for the laser welding.

Preferably, the housing body or the housing cover is plated with silver.

Also, the housing cover or the housing cover is plated with bright silver.

Also, at least one hole for inserting the tuning screw which is formed from burring by punching is formed in the housing cover or the tuning screw is screwed in pressurized nut inserted in hole in the housing cover.

Also, at least two fixing holes are formed in the housing cover and the housing body, and fixing means for being inserted into the fixing holes are further comprised, before laser welding of the housing cover and the housing body, the fixing means are inserted into the fixing holes to fix the two.

Meanwhile, the tuning screw can be connected in backside of the housing body.

Advantageous Effects

As mentioned above, the radio frequency filter according to the present invention can reduce PIMD due to reduce Contact Nonlinearity, because the housing and the housing cover are laser welded to each other.

The radio frequency filter according to the present invention is easy to be laser welded because the housing cover is made of AL40 type aluminium.

The radio frequency filter according to the present invention can reduce reflex laser beam and reduce PIMD because the housing cover is coated silver coating on its surface.

The radio frequency filter according to the present invention can inhibit to erode away because the laser welding method dissolve different metallic materials each other and take a convalent bond.

Furthermore, the radio frequency filter according to the present invention reduce its manufacturing process time and cost because it is unnecessary drilling a hole and fastening a screw to fasten the housing and the housing cover each other.

The radio frequency filter according to the present invention is simple its manufacturing process and raise productivity because only irradiate laser beam on irradiated area of the housing cover.

MODE FOR THE INVENTION

Hereinafter, preferred embodiments of the present invention will be described with reference to the accompanying drawings.

Figure 3:
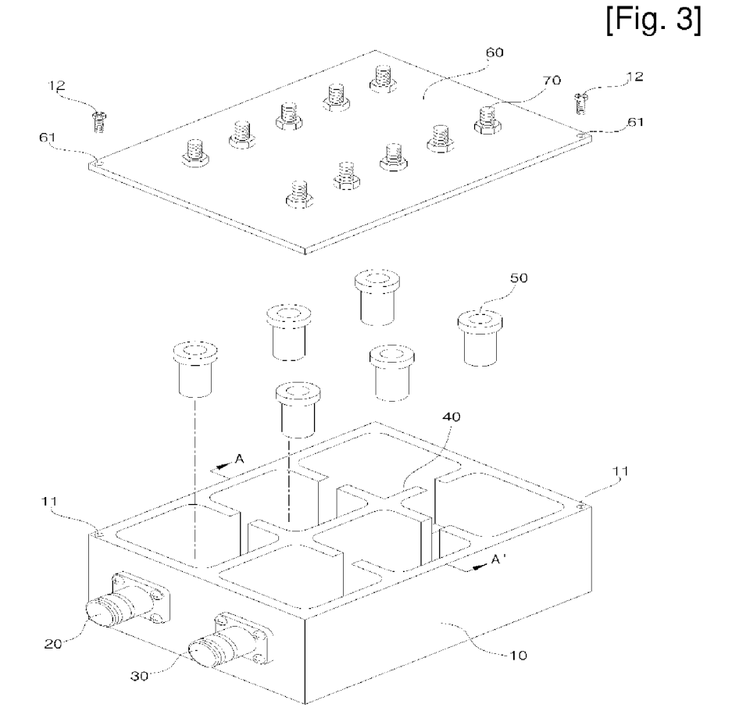
FIG. 3 is perspective view of radio frequency filter according to present invention.
Figure 4:
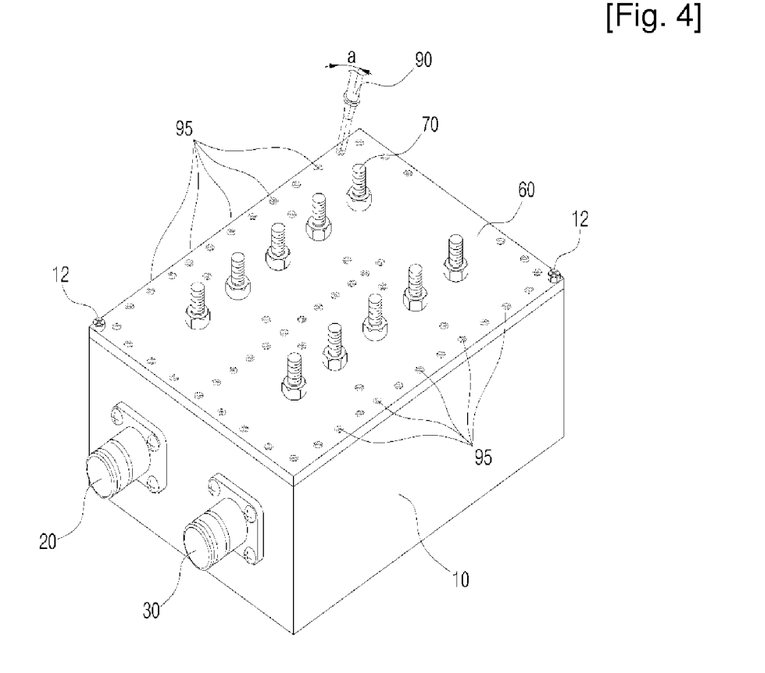
FIG. 4 is another perspective view of radio frequency filter according to present invention.
Figure 5:
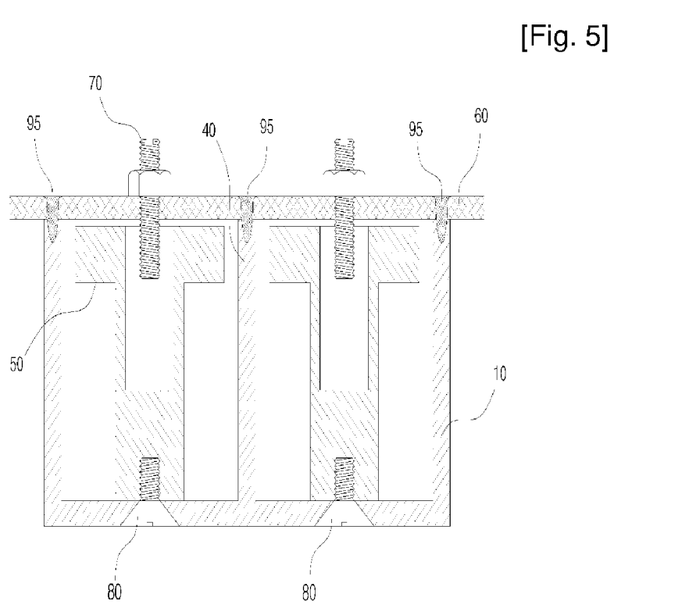
FIG. 5 is sectional view showing the construction of the radio frequency filter of FIG. 3, taken along line A-A'.

FIG. 3 is a perspective view showing a disassembled radio frequency filter according to the present invention, and FIG. 4 is a perspective view showing an assembled radio frequency filter according to the present invention, and FIG. 5 is a side sectional view showing the inside of the radio frequency filter of FIG. 3, taken along line A-A'.

Figure 6:
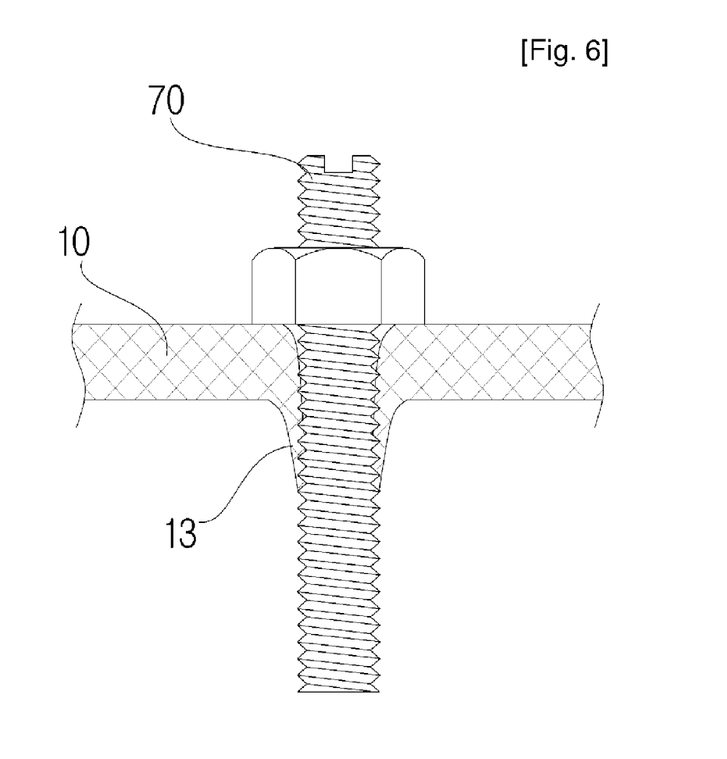
FIG. 6 is sectional view illustrating tunning screws screwed into burring formed in housing cover.
Figure 7:
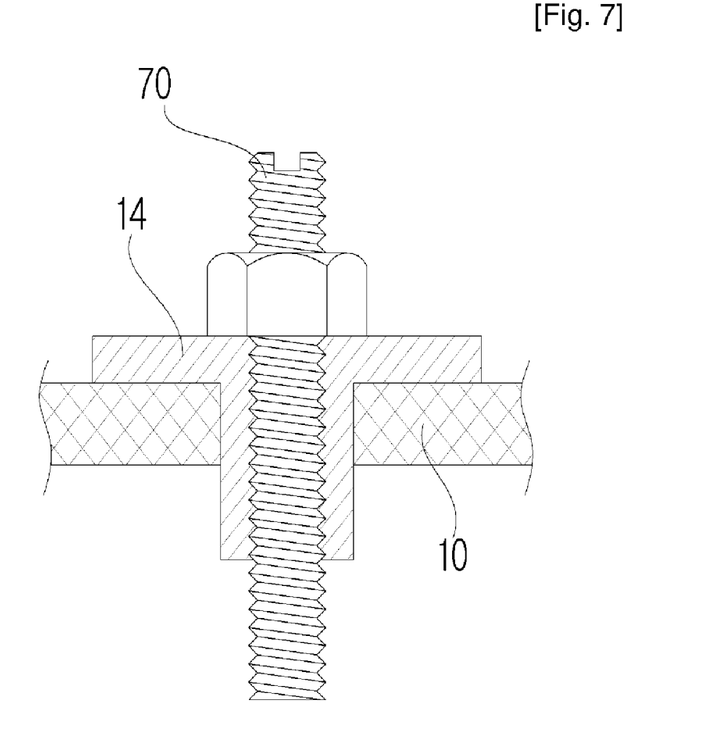
FIG. 7 is sectional view illustrating tunning screws screwed into nut inserted to housing cover.

FIG. 6 is a side sectional view illustrating the construction of inserting screws in the holes formed housing cover, FIG. 7 is a side sectional view illustrating the construction of inserting pressure nuts in the holes formed housing cover.

Figure 8:
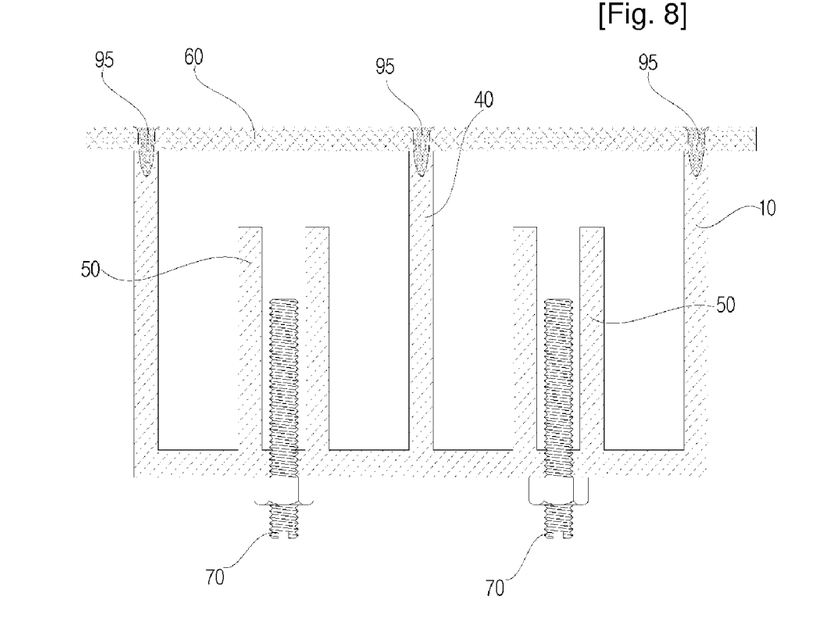
FIG. 8 is sectional view illustrating said tunning screws screwed in backside of housing body.

FIG. 8 is a side sectional view illustrating the construction of the whole body containing the resonator rods and the housing body.

The radio frequency filter according to the present invention comprises a housing 10 having input connector 20 and output connector 30 and a number of containing spaces divided by diaphragms 40; resonator rods joined with a containing spaces in housing; housing cover 60 joined upside of housing 10; wherein the housing body 10 and housing cover 60 are connected to each other by laser welding.

Generally, in radio frequency filter, housing body 10 and housing cover 60 are connected each other by screws. But, in this present invention, housing body 10 and housing cover 60 are connected each other by laser welding method heating those partially using laser beam.

As Shown in FIG. 3 and FIG. 4, after the housing body 10 and housing cover 60 are joined, those are laser welded by incidence angle between laser beam of the laser welding and the housing cover in the range of 0 to 45 degree.

By using this laser welding method, the radio frequency filter can be laser welded at connecting areas of diaphragms 40 contained in the housing body 10 and housing cover 60.

The reason for irradiating laser beam at an angle 5 to 10 degree for upper surface of the housing cover 60, is to prevent laser welding apparatus from being damaged by laser beam reflected from the housing cover 60.

For connecting housing body 10 and housing cover 60, more than two fastening holes 11, 61 are provided in housing body 10 and housing cover 60 and fastening means 12 can be inserted in the fastening holes 11, 61.

After completing laser welding, the fastening means 12 can be removed from the fastening holes 11, 61.

The fastening means 12 are temporary means to fasten housing body 10 and housing cover 60 before laser welding, and various types of fastening means can be available.

For example, screws or fastening pins can be provided as fastening means 12.

Also, the fastening holes 11, 61 can be provided in various numbers in various position.

Desirably, as Shown in FIG. 3, two fastening holes 11, 61 can be provided in opposite corners of the housing body 10 and housing cover 60.

And fastening means 12 can be provided for the same number corresponding to the number of the fastening holes 11, 61.

The fastening means 12 and fastening holes 11, 61 are temporary means to fasten housing body 10 and housing cover 60 before laser welding.

Therefore, if jigs are used for fastening, the fastening means 12 and the fastening holes 11, 61 are not necessary.

Meanwhile, after housing body 10 and housing cover 60 are connected, the boundary layer of the two can be laser welded.

By this laser welding for the boundary layer, sealing condition between the housing body 10 and the housing cover 60 can be maintained, and contact nonlinearity and PIMD can be reduced.

And, if the housing body 10 and housing cover 60 are heated using laser beam, joining area of the two 95 are melted.

And as shown in FIG. 3, covalent bond are created between the two metal particle in the joining area, so corrosion caused by different metals contact can be prevented.

The radio frequency filter can be laser welded at various number of joining areas 95 according to the size of the radio frequency filter.

The radio frequency filter can be welded in the shape of spot at constant interval, or this interval can be reduced to form a shape of seam.

Also, the diameter of focus of laser beam for the laser welding can be formed in the size approximately from 200 μm to 1000 μm.

If the diameter of focus of laser beam is too small, object material can be cut, if the diameter of focus of laser beam is too big, object material can not be laser welded.

Meanwhile, the housing body 10 and housing cover 60 are generally made of aluminium (AL) series material, the housing body 10 and housing cover 60 can be made of AL40 series aluminium alloy.

Therefore, when the housing body 10 and housing cover 60 are laser welded, bonding between AL40 series and AL40 series or AL40 series and none AL40 series aluminium alloy can be created.

But, if none of the housing body 10 and housing cover 60 is made of AL40 series aliminium alloy, welding material of AL40 series aliminium alloy can be used in laser welding of CLAD method.

Thus, occurrence of PIMD can be reduced by using welding material which has high transmission feature of electronic wave.

In the radio frequency filter according to the present invention, for improving feature of frequency transmission, surface of the housing body 10 or the housing cover 60 can be coated with silver.

Also, when the surface of the housing body 10 or the housing cover 60 is coated with silver, it can be coated with luster silver.

If the housing body 10 is coated with luster silver coating, the housing cover 60 can be coated with deadening or dull silver coating which has lower reflexibility than luster silver.

But, if laser beam absorbing member is added on irradiated area of the housing cover 60, the housing cover 60 can be coated with luster silver coating on its surface.

As a laser beam absorbing member, for example metallic material with lower reflexibility for laser beam can be attached on irradiated area of the housing cover 60, and after that laser beam can be irradiated.

Otherwise, irradiated area of the housing cover 60 can be masked for being not coated with silver.

Accordingly, the radio frequency filter according to the present invention can raise frequency transmission characteristic and make excellent appearance with sliver coating on the housing body 10 and housing cover 60.

The housing cover can be made to have various thickness and it is desirable to have thickness from approximately 0.1 mm to 4 mm.

Because, if the housing cover 60 is made to have thickness less than 0.1 mm, it may be transformed by load applied on it and it may be difficult to fasten the tunning screw 70, because for that thin thickness it is difficult to make a screw thread in the housing cover.

If the housing cover 60 is made to have thickness more than 4 mm, it is difficult to laser weld because of thick thickness and is difficult to make a process of rolling AL40 type aluminium alloy including silicon (Si) more than 10%.

By roll processing the housing cover 60, it is possible to form the housing cover 60 maintaining characteristic of the AL40 series aluminium alloy.

The meaning of "approximately" is not exactly from 0.1 mm to 4 mm but adjacent range is possible from the range of 0.1 mm to 4 mm for demands.

As shown in FIG. 5, the tunning screw 70 is inserted and fixed in the housing cover 60.

In the housing cover 60 holes can be formed to insert the tunning screws 70 and these holes can be made by punching.

If the housing cover 60 is too thin to fasten the tunning screw 70, after the holes are made by punching to form burring, screw thread can be made inside the burring, as shown in FIG. 6, or pressure nut 14 can be inserted in the holes to screw the tunning screws 70 as shown in FIG. 7.

As shown in FIG. 8, the tunning screw 70 can be fastened in the back side of the housing 10.

The invention claimed is:

1. A method for manufacturing a radio frequency filter, the method comprising:
   manufacturing a housing body having input/output connectors and containing space which is divided into spaces by means of a diaphragm;
   arranging at least one resonator rod in the housing;
   coupling a housing cover to the housing body;
   wherein the housing body and the housing cover are connected to each other by laser welding and the housing cover has thickness in the range of about 0.1 to about 4 millimeters.

2. The method as claimed in claim 1 further comprising the step of installing at least one tuning screw for tuning resonance frequency in the housing cover.

3. The method as claimed in claim 1, wherein an incidence angle between a laser beam and the housing cover is in the range of 0 to 45 degrees.

4. The method as claimed in claim 1 further comprising the step of, after the housing body and the housing cover are coupled, welding a boundary layer of the two by laser welding.

5. The method as claimed in claim 1, wherein the diameter of the laser beam focus is approximately in the range of 200-1000 micrometers.

6. The method as claimed in claim 1, wherein the step of manufacturing the housing cover is by rolling.

7. The method as claimed in one of claim 1 to claim 5, wherein the housing body and the housing cover are made of aluminum alloy.

8. The method as claimed in one of claim 1 to claim 5, wherein the housing cover is made of AL40 series aluminum alloy.

9. The method as claimed in one of claim 1 to claim 5, wherein the housing body is made of AL40 series aluminum alloy.

10. The method as claimed in one of claim 1 to claim 5 further comprising the step of, if all the housing body and the housing cover are not made of AL40 series aluminum alloy, laser welding with AL40 series aluminum alloy.

11. The method as claimed in claim 1, the housing body or the housing cover is plated with silver.

12. The method as claimed in claim 11, the housing cover is plated with deadening or dull silver.

13. The method as claimed in claim 5 further comprising the step of forming at least one hole for inserting the tuning screw in the housing cover.

14. The method as claimed in claim 1 further comprising the steps of:
   forming at least two fixing holes in the housing cover and the housing body;
   providing fixing means for being inserted into the fixing holes; and
   before laser welding of the housing cover and the housing body, inserting the fixing means into the fixing holes to fix the housing cover and the housing body.

15. The method as claimed in claim 2, wherein the tuning screw is connected in the backside of the housing body.

16. The method as claimed in claim 13 further comprising the step of inserting a threaded nut in the hole in the housing cover to screw the tuning screws.

* * * * *

UNITED STATES PATENT AND TRADEMARK OFFICE
CERTIFICATE OF CORRECTION

PATENT NO. : 8,072,298 B2  
APPLICATION NO. : 12/514482  
DATED : December 6, 2011  
INVENTOR(S) : Duk-Yong Kim et al.

Page 1 of 1

It is certified that error appears in the above-identified patent and that said Letters Patent is hereby corrected as shown below:

In Column 8, Line 1, Claim 7, after the word "claim" please delete "5" and insert --6--.

In Column 8, Line 4, Claim 8, after the word "claim" please delete "5" and insert --6--.

In Column 8, Line 7, Claim 9, after the word "claim" please delete "5" and insert --6--.

In Column 8, Line 10, Claim 10, after the word "claim" please delete "5" and insert --6--.

In Column 8, Line 18, Claim 13, after the word "claim" please delete "5" and insert --6--.

Signed and Sealed this  
Thirty-first Day of July, 2012

David J. Kappos  
*Director of the United States Patent and Trademark Office*